W. E. WHITEHEAD & A. T. ATHERTON.
Cotton Opener and Lapper.
No. 208,353.                Patented Sept. 24, 1878.
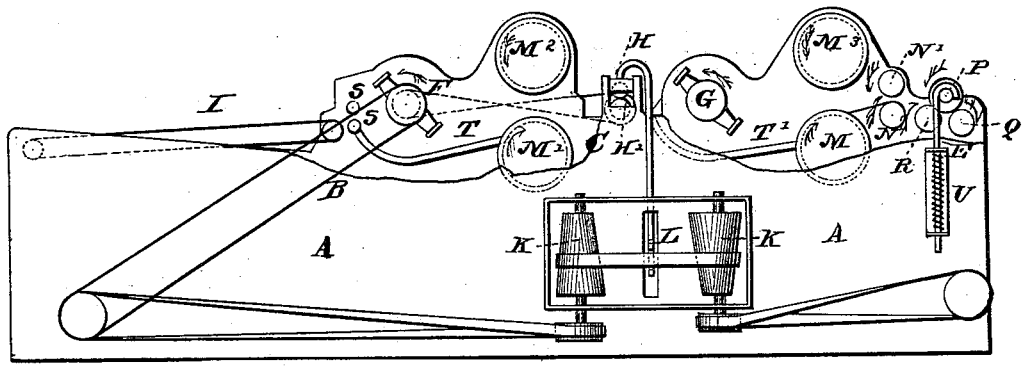

UNITED STATES PATENT OFFICE.

WILLIAM E. WHITEHEAD, OF MILES PLATTIN, ENGLAND, AND ABEL T. ATHERTON, OF LOWELL, MASSACHUSETTS.

IMPROVEMENT IN COTTON OPENERS AND LAPPERS.

Specification forming part of Letters Patent No. 208,353, dated September 24, 1878; application filed April 24, 1878.

*To all whom it may concern:*

Be it known that we, WILLIAM E. WHITEHEAD, of Miles Plattin, county of Lancaster, England, and ABEL T. ATHERTON, of Lowell, in the county of Middlesex and Commonwealth of Massachusetts, have invented certain Improvements in Cotton Openers and Lappers, of which the following is a specification:

Our invention relates to machines for opening and lapping raw cotton; and it consists in the combination of a feed mechanism, a beater, a pair of collecting-cages, an evening mechanism, a second beater, and a second set of collecting-cages, the evening mechanism being arranged in rear of the first beater and in front of the second one, as will be hereinafter more fully set forth.

The accompanying drawing is a side view of a machine embodying our invention, the frame being broken away on lines B C and D E to show the internal arrangement.

A is the frame of the machine. I is the feed-apron; S S, the feed-rolls before F, the first beater. M¹ M² are the cages which collect the cotton after being operated by the first beater. H H' are the evener-rolls. G is the second beater. M M³ are the cages collecting the cotton from the second beater. N N' R Q are the calender-rolls, which, in connection with the lap-roll P, operate in forming the lap. K K are the cones, and L is the belt-shipper.

The operation of this machine is as follows: The cotton to be operated upon is distributed on the apron by the hand of the operator, the same as on the ordinary breaker-lapper. It then passes between the feed-rolls S S to the beater F, which opens it and passes it in a fleecy condition to the collecting-cages M¹ M², which deliver it to the evener-rolls H H' in a condition suitable to be successfully operated upon by the evener. From thence the cotton passes to the second beater, G, and from there between the cages M M³ to the lap-forming mechanism.

The machines as heretofore constructed with an evener before the first beater necessitated the passing of the cotton twice through the machine or through other preparatory machinery, the breaker-lapper receiving the cotton for the finishing operation in the form of laps, as the cotton, when fed to the machine from the bale, is in such a hard compressed condition that it cannot be operated upon successfully by the evener.

By the use of our invention the cotton, after passing the first beater, is delivered to the evener-rolls in a form well adapted to be operated upon by the evening mechanism, so that the cotton passing through this machine once is in a fit condition for the carding-engines, thereby saving the operation of one machine or the necessity of passing the cotton twice through one machine.

We are aware that it is not new in this class of machines to arrange two or more beaters in line in the same machine for operating upon the fibrous material in succession.

We are also aware that it is not new to arrange an evening mechanism in front of the first beater, and we do not claim such as our invention.

In machines where the evener is in front of the first beater it is impracticable to operate upon the cotton direct from the bale.

The object of our invention is to produce finished laps from the raw cotton for the carding-engines, and to this end we place the evening mechanism in rear of the first beater, so that the cotton, as it comes from the bale, will be beaten up and be in a light fleecy condition before it reaches the evener.

The advantages of our invention can be briefly set forth as follows: A single machine, whether containing one or more beaters, must have a lap-forming mechanism, in order to put the cotton in a portable form. It has heretofore been necessary to pass the cotton through a machine which should deliver it in the form of a lap before passing to a finisher-lapper, which has an evener before the first beater, the latter machine also requiring a lap-forming mechanism. The fact of a machine having two or more beaters following the evener in no way affects this result.

In our machine two beaters, one evener, one lap-forming mechanism, and one feed-apron do as much work and better than has heretofore been accomplished by two machines, which must of necessity be provided with at least two beaters, two feed-aprons, one evener, and two lap-forming mechanisms.

In the common way of opening the cotton by passing the same to the evener, either when first taken from the bale or when fed to the machine in the form of laps from the breaker-lapper, the density of the cotton in both instances interferes in a great measure with the sensitiveness of the evener, as it is necessary to so even the cotton that there shall be no perceptible difference in the weight of the different laps that are formed.

By the arrangement of our evening mechanism we operate on the cotton when the same is in a light fleecy condition, having been drawn together by the action of the collecting-cages. In this form the evening mechanism operates much more sensitively than it can possibly do when the cotton is fed to it direct from the bale or in the compressed form known as "laps."

We thus, by our invention, employ less machinery, and effect a saving in the handling of the cotton, permitting at the same time the evening mechanism to operate on the cotton when the same is in a form best adapted for that purpose.

We claim as our invention—

In a machine for beating or opening cotton or other fibrous material, the combination of a feed mechanism, a beater, a set of collecting-cages, an evening mechanism, a second beater, and a second set of collecting-cages, the evening mechanism being arranged in rear of the first and in front of the second beater, substantially as and for the purposes herein set forth.

WILLIAM ED. WHITEHEAD.
ABEL T. ATHERTON.

Witnesses:
GEO. N. McEVOY,
EDWARD W. THOMPSON.